US012598057B2

(12) United States Patent
Nakagawa et al.

(10) Patent No.: US 12,598,057 B2
(45) Date of Patent: Apr. 7, 2026

(54) SIMILARITY CALCULATION SYSTEM, SIMILARITY CALCULATION APPARATUS, SIMILARITY CALCULATION METHOD, AND SIMILARITY CALCULATION PROGRAM

(71) Applicant: NEC Corporation, Tokyo (JP)

(72) Inventors: Sanami Nakagawa, Tokyo (JP); Toshiyuki Isshiki, Tokyo (JP); Hiroto Tamiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 182 days.

(21) Appl. No.: 18/275,958

(22) PCT Filed: Feb. 10, 2021

(86) PCT No.: PCT/JP2021/004898
§ 371 (c)(1),
(2) Date: Aug. 4, 2023

(87) PCT Pub. No.: WO2022/172347
PCT Pub. Date: Aug. 18, 2022

(65) Prior Publication Data
US 2024/0121075 A1      Apr. 11, 2024

(51) Int. Cl.
*H04K 1/00* (2006.01)
*G09C 1/06* (2006.01)
(Continued)

(52) U.S. Cl.
CPC ............... *H04L 9/008* (2013.01); *G09C 1/06* (2013.01)

(58) Field of Classification Search
CPC .................................. H04L 9/008; G09C 1/06
(Continued)

(56) References Cited

U.S. PATENT DOCUMENTS 8,281,148 B2    10/2012  Tuyls et al.
8,958,552 B2    2/2015   Hattori et al.
(Continued)

FOREIGN PATENT DOCUMENTS

JP      2008-521025 A    6/2008
JP      2011-081728 A    4/2011
(Continued)

OTHER PUBLICATIONS

International Search Report for PCT Application No. PCT/JP2021/004898, mailed on May 11, 2021.
(Continued)

*Primary Examiner* — Jeffrey C Pwu
*Assistant Examiner* — Samuel Ambaye
(74) *Attorney, Agent, or Firm* — Sughrue Mion, PLLC

(57) ABSTRACT

A similarity calculation system calculating a distance between a first vector stored in a similarity calculation apparatus and a second vector entered from an input terminal wherein the similarity calculation apparatus transmits to the input terminal a ciphertext of each element of the first vector and a weighted distance table with respect to combinations of possible values of the elements of the first vector and the second vector, and the input terminal refers to the weighted distance table to calculate a ciphertext of element distances for all combinations of the value of a single element of the second vector and possible values of elements of the first vector, calculates the ciphertexts of the sum of the element distances for each element of the second vector using additive homomorphic encryption, and transmits the ciphertext of the sum to the similarity calculation apparatus.

12 Claims, 4 Drawing Sheets

(51) Int. Cl.
    *H04L 9/00*       (2022.01)
    *H04L 9/28*       (2006.01)

(58) Field of Classification Search
    USPC ......................................................... 380/28
    See application file for complete search history.

(56)          References Cited

U.S. PATENT DOCUMENTS

| | | |
|---|---|---|
| 9,729,548 B2 | 8/2017 | Patey et al. |
| 2009/0006855 A1 | 1/2009 | Tuyls et al. |
| 2012/0207299 A1 | 8/2012 | Hattori et al. |
| 2013/0318351 A1* | 11/2013 | Hirano .................. H04L 9/3231 |
| | | 713/168 |
| 2014/0185797 A1* | 7/2014 | Yasuda ................... H04L 9/008 |
| | | 380/44 |
| 2015/0007258 A1 | 1/2015 | Patey et al. |

FOREIGN PATENT DOCUMENTS

| | | |
|---|---|---|
| JP | 2015-506485 A | 3/2015 |
| JP | 2016-009243 A | 1/2016 |
| JP | 2017-111793 A | 6/2017 |
| WO | 2011/052056 A1 | 5/2011 |

OTHER PUBLICATIONS

Hongchao Zhou et al., "Efficient homomorphic encryption integer vectors and its applications", 2014 Information Theory and Applications Workshop (ITA), Feb. 2014, pp. 1-9, DOI:10.1109/ITA.2014.6804228.

Cheng Guo et al., "Privacy preserving weighted similarity search scheme for encrypted data", IET Information Security, Aug. 10, 2018, vol. 13, Issue 1, pp. 61-69, DOI:10.1049/iet-ifs.2018.5187.

* cited by examiner

100

120

110

INPUT TERMINAL

SIMILARITY CALCULATION APPARATUS

SIMILARITY CALCULATION SYSTEM, SIMILARITY CALCULATION APPARATUS, SIMILARITY CALCULATION METHOD, AND SIMILARITY CALCULATION PROGRAM

This application is a National Stage Entry of PCT/JP2021/004898 filed on Feb. 10, 2021, the contents of all of which are incorporated herein by reference, in their entirety.

FIELD

The present invention relates to a similarity calculation system, similarity calculation apparatus, similarity calculation method, and similarity calculation program.

BACKGROUND

Homomorphic encryption is a cryptographic technique. When ciphertexts $Enc(m_1)$, $Enc(m_2)$ of plaintexts $m_1$, $m_2$ are given, homomorphic encryption allows a ciphertext $Enc(m_1 \circ m_2)$ of a binary operation $m_1 \circ m_2$ of the plaintexts $m_1$, $m_2$ to be computed without the ciphertext $Enc(m_1 \circ m_2)$ being decrypted back into the plaintexts $m_1$, $m_2$. Here, "$\circ$" is a binary operation, such as addition "+" or multiplication "x." Further, homomorphic encryption related to addition "+" is called additive homomorphic encryption. Homomorphic encryption is used as an underlying technology for various cryptographic protocols.

Similarity calculation is such a cryptographic protocol using homomorphic encryption. The following describes similarity calculation using a film recommendation service as an application of similarity calculation. In a film recommendation service, when it is determined whether or not a certain film M* suits the taste of a certain user Y, computation is performed to find another user whose ratings for films other than the film M* are similar to the user Y's. More specifically, the similarity between the user Y and another user $U_i$ of the rating values for films $M_1$, $M_2$, . . . , $M_n$ is calculated, and if the similarity is high, the users Y and $U_i$ are determined to also have similar ratings for the film M*. As the similarity, Euclidean distance or cosine similarity may be used, and an important requirement is to calculate the similarity while keeping the rating values of each user confidential. Homomorphic encryption is used in such a case where computation is performed while keeping the subject of the computation secret (for instance, refer to Patent Literature 1).

[Patent Literature 1]
  Japanese Patent Kokai Publication No. JP-P2017-111793A

SUMMARY

The disclosure of the literature in Citation List above is incorporated herein in its entirety by reference thereto. The following analysis is given by the present inventors.

When designing a similarity measure, weighting is sometimes performed. For instance, if the similarity of the rating values for the film $M_1$ is more important than that of the rating values for the film $M_2$, the similarity of the rating values for each film is weighted for evaluation. The so-called "weighted Euclidean distance" is an example of weighted similarity. In such a case, it is possible to calculate the similarity, using additive homomorphic encryption, while keeping the rating values of each user confidential. This is because, in additive homomorphic encryption, even computation with respect to a scalar multiple of a plaintext can be performed without decrypting the ciphertext.

Meanwhile, if weighting is performed more elaborately, computation using additive homomorphic encryption presents some problems. For instance, the rating values of a single film may be weighted differently, depending on whether the rating values are similar and favorable or they are similar and unfavorable. More specifically, let's say films are rated on a 0-5 scale with "5" being most favorable. The differences between "0" and "1" and between "4" and "5" are both 1, however, the difference between "4" and "5," which are more favorable ratings, can be reflected more strongly in similarity.

In such a case, performing weighted similarity calculation with additive homomorphic encryption is problematic. In additive homomorphic encryption, it is possible to perform computation without decrypting the ciphertext when the weight is a scalar multiple of the plaintext, however, in a case of a nonlinear weight (not a scalar multiple), computation cannot be performed within the scope of operations defined in additive homomorphic encryption.

In view of the problem above, it is an object of the present invention to provide a similarity calculation system, similarity calculation apparatus, similarity calculation method, and similarity calculation program that contribute to calculating nonlinearly weighted similarity without decrypting the ciphertext.

According to a first aspect of the present invention, there is provided a similarity calculation system calculating a distance between a first vector encrypted and stored in a similarity calculation apparatus and a second vector entered from an input terminal, wherein the similarity calculation apparatus transmits to the input terminal a ciphertext of each element of the first vector and a weighted distance table with respect to combinations of possible values of the elements of the first vector and possible values of the elements of the second vector, the input terminal refers to the weighted distance table to calculate a ciphertext of element distances for all combinations of the value of a single element of the second vector and possible values of elements of the first vector corresponding to the single element, calculates the ciphertexts of the sum of the element distances for each element of the second vector using additive homomorphic encryption, and transmits a ciphertext of the sum to the similarity calculation apparatus, and the similarity calculation apparatus extracts the distance between the first and the second vectors from the ciphertext of the sum.

According to a second aspect of the present invention, there is provided a similarity calculation apparatus calculating a distance between a first vector stored while being encrypted and a second vector entered from an input terminal, the similarity calculation apparatus transmitting to the input terminal a ciphertext of each element of the first vector and a weighted distance table with respect to combinations of possible values of the elements of the first vector and possible values of the elements of the second vector; having the input terminal refer to the weighted distance table to calculate a ciphertext of element distances for all combinations of the value of a single element of the second vector and possible values of elements of the first vector corresponding to the single element and receiving from the input terminal the ciphertext of the sum of the element distances calculated for each element of the second vector using additive homomorphic encryption; and extracting the distance between the first and the second vectors from the ciphertext of the sum.

According to a third aspect of the present invention, there is provided a similarity calculation method calculating a distance between a first vector encrypted and stored in a similarity calculation apparatus and a second vector entered from an input terminal, wherein the similarity calculation apparatus transmits to the input terminal a ciphertext of each element of the first vector and a weighted distance table with respect to combinations of possible values of the elements of the first vector and possible values of the elements of the second vector, the input terminal refers to the weighted distance table to calculate a ciphertext of element distances for all combinations of the value of a single element of the second vector and possible values of elements of the first vector corresponding to the single element, calculates the ciphertexts of the sum of the element distances for each element of the second vector using additive homomorphic encryption, and transmits the ciphertext of the sum to the similarity calculation apparatus, and the similarity calculation apparatus extracts the distance between the first and the second vectors from the ciphertext of the sum.

According to a fourth aspect of the present invention, there is provided a similarity calculation program causing a computer to calculate a distance between a first vector stored while being encrypted and a second vector entered from an input terminal, the similarity calculation program transmitting to the input terminal a ciphertext of each element of the first vector and a weighted distance table with respect to combinations of possible values of the elements of the first vector and possible values of the elements of the second vector; having the input terminal refer to the weighted distance table to calculate a ciphertext of element distances for all combinations of the value of a single element of the second vector and possible values of elements of the first vector corresponding to the single element and receiving from the input terminal the ciphertext of the sum of the element distances calculated for each element of the second vector using additive homomorphic encryption; and extracting the distance between the first and the second vectors from the ciphertext of the sum. Further, this program can be stored in a computer-readable storage medium. The storage medium may be a non-transient one such as a semiconductor memory, a hard disk, a magnetic recording medium, an optical recording medium, and the like. The present invention can also be realized as a computer program product.

According to each aspect of the present invention, it becomes possible to provide a similarity calculation system, similarity calculation apparatus, similarity calculation method, and similarity calculation program that contribute to calculating nonlinearly weighted similarity without decrypting the ciphertext.

EXAMPLE EMBODIMENTS

Example embodiments of the present invention will be described with reference to the drawings. The present invention, however, is not limited to the example embodiments described below. Further, in each drawing, the same or corresponding elements are appropriately designated by the same reference signs. It should also be noted that the drawings are schematic, and the dimensional relationships and the ratios between the elements may differ from the actual ones. The dimensional relationships and the ratios between drawings may also be different in some sections.

First Example Embodiment

Figure 1:
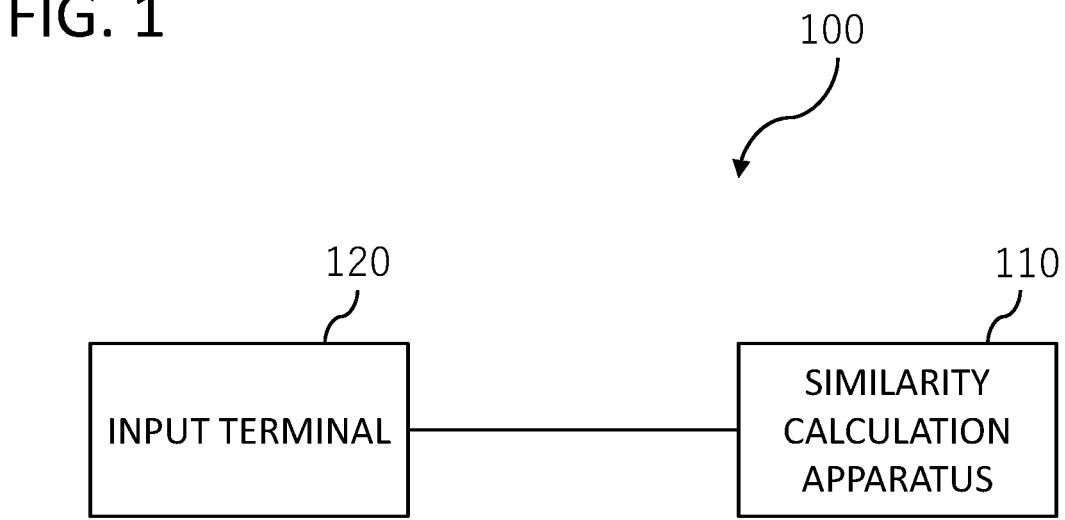
FIG. 1 is a block diagram showing a schematic configuration example of a similarity calculation system according to a first example embodiment.
Figure 2:
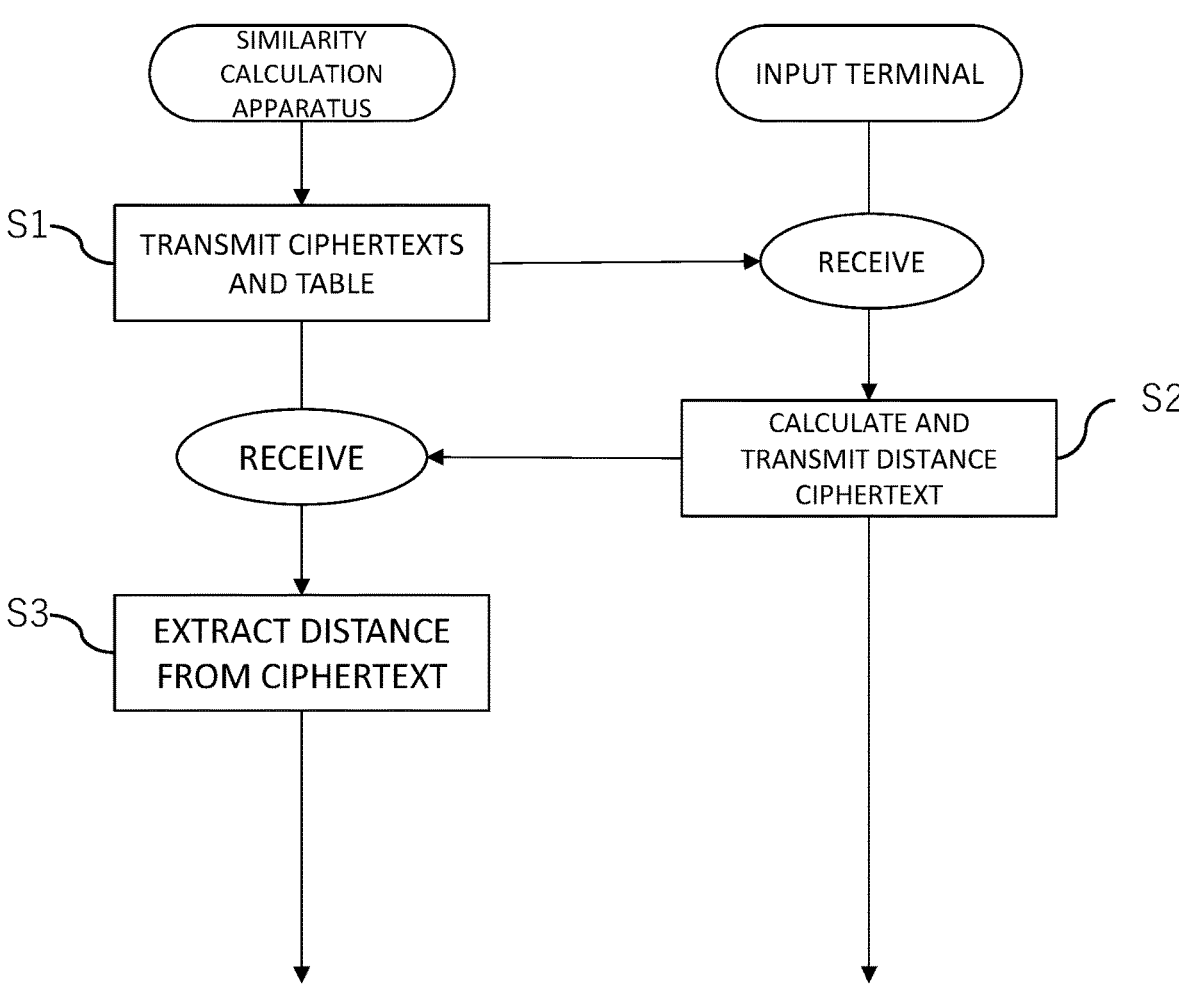
FIG. 2 is a system flowchart of the similarity calculation system according to the first example embodiment.

The following describes a similarity calculation system relating to a first example embodiment with reference to FIGS. 1 and 2. In the first example embodiment, only the basic concept of the present invention is described.

FIG. 1 is a block diagram showing a schematic configuration example of the similarity calculation system according to the first example embodiment. As shown in FIG. 1, the similarity calculation system 100 relating to the first example embodiment comprises a similarity calculation apparatus 110 and an input terminal 120. The similarity calculation apparatus 110 is an information processing apparatus (computer), the hardware configuration of which will be described using an example later. The input terminal 120 may be a stand-alone information processing apparatus (computer) or a device that is part of the similarity calculation apparatus 110. The similarity calculation apparatus 110 and the input terminal 120 may be connected by wired or wireless communication. For instance, the input terminal 120 may be a general-purpose personal computer or a mobile terminal such as a smartphone.

The similarity calculation system 100 relating to the first example embodiment shown in FIG. 1 calculates the distance between a first vector encrypted and stored in the similarity calculation apparatus 110 and a second vector entered from the input terminal 120. The first vector $(x_1, x_2, \ldots, x_n)$ has each of its elements $x_i$ ($i=1, \ldots, n$) taking values from 0 to S (i.e., $x_1 \in \{0, 1, 2, \ldots, S\}$), and the second vector $(y_1, y_2, \ldots, y_n)$ also has each of its elements $y_1$ ($i=1, \ldots, n$) taking values from 0 to S (i.e., $y_1 \in \{0, 1, 2, \ldots, S\}$). The distance between the first vector $(x_1, x_2, \ldots, x_n)$ and the second vector $(y_1, y_2, \ldots, y_n)$ allows non-linear weighting. Further, the non-linear weighting here does not mean giving different constant weights to the elements of the first vector $(x_1, x_2, \ldots, x_n)$ and the second vector $(y_1, y_2, \ldots, y_n)$, but it means that the weight value varies according to the values of elements $x_i$, $y_i$ ($i=1, \ldots, n$).

Next, with reference to FIG. 2, processes between the similarity calculation apparatus 110 and the input terminal 120 will be described. FIG. 2 is a system flowchart of the similarity calculation system according to the first example embodiment. The system flowchart shown in FIG. 2 shows the configurations required for the similarity calculation apparatus 110 and the input terminal 120 and also shows the procedure of a similarity calculation method for calculating the distance between the first vector encrypted and stored in the similarity calculation apparatus 110 and the second vector entered from the input terminal 120.

In step S1, the similarity calculation apparatus 110 transmits to the input terminal a ciphertext of each element $x_i$ ($i=1, \ldots, n$) of the first vector and a weighted distance table with respect to combinations of possible values ($x_1 \in \{0, 1, 2, S\}$) of the elements of the first vector and possible values ($y_i \in \{0, 1, 2, \ldots, S\}$) of the elements of the second vector. An example of the weighted distance table with respect to combinations of possible values ($x_1 \in \{0, 1, 2, \ldots, S\}$) of the elements of the first vector and possible values ($y_i \in \{0, 1, 2, \ldots, S\}$) of the elements of the second vector when $S=5$ is shown below:

TABLE 1

| | | First vector element value | | | | | |
|---|---|---|---|---|---|---|---|
| | | 0 | 1 | 2 | 3 | 4 | 5 |
| Second | 0 | 0 | +1 | +2 | +50 | +100 | +500 |
| vector | 1 | +1 | 0 | +1 | +30 | +50 | +200 |
| element | 2 | +2 | +1 | 0 | +1 | +30 | +50 |
| value | 3 | +50 | +30 | +1 | 0 | +1 | +30 |
| | 4 | +100 | +50 | +30 | +1 | 0 | +1 |
| | 5 | +500 | +200 | +50 | +30 | +1 | 0 |

In step S2, the input terminal 120 refers to the weighted distance table and calculates a ciphertext of element distances for all combinations of the value of a single element of the second vector and possible values of elements of the first vector corresponding to this single element. Then, the input terminal 120 calculates the ciphertexts of the sum of the element distances for each element of the second vector using additive homomorphic encryption, and transmits a ciphertext of the calculated sum to the similarity calculation apparatus 110.

It should be noted that, since the input terminal 120 receives the ciphertext of each element $x_i$ (i=1, . . . , n) of the first vector as stated above, it cannot know the values of the elements of the first vector. Therefore, the input terminal 120 calculates a ciphertext of the element distances for all combinations of possible values of the elements of the first vector. More specifically, with each element in the weighted distance table being $a^i[x_i][y_i]$, the input terminal 120 calculates all of $a^i[0][y_i]$, $a^i[1][y_i]$, $a^i[2][y_i]$, . . . , $a^i[S][y_i]$ and encrypts the results.

Then, the input terminal 120 calculates the ciphertexts of the sum of the element distances using additive homomorphic encryption. The ciphertexts of the element distances calculated using the above method are for one element of the second vector, and the ciphertexts of the element distances obtained for all the elements of the second vector are summed. At this time, the input terminal 120 sums the ciphertexts without decrypting them using additive homomorphic encryption. In other words, the ciphertexts of all the element distances are summed with respect to the indices of the second vector ($y_1$, $y_2$, . . . , $y_n$). Then, the input terminal 120 transmits the calculated sum to the similarity calculation apparatus 110.

In step S3, the similarity calculation apparatus 110 extracts the distance between the first and the second vectors from the ciphertext of the sum received from the input terminal 120. As can be seen from the calculation in the step S2, unnecessary information is included because the ciphertexts were calculated from the element distances with respect to all combinations with possible values of the elements of the first vector. The similarity calculation apparatus 110 extracts necessary information from the ciphertext of the sum received from the input terminal 120.

As described above, the similarity calculation system according to the first example embodiment is able to contribute to calculating nonlinearly weighted similarity without decrypting the ciphertext. Further, the similarity calculation system according to the first example embodiment can be implemented as a similarity calculation method, and the similarity calculation method according to the first example embodiment can be implemented as a program executed by an information processing apparatus (computer) with the hardware configuration described later.

Second Example Embodiment

Figure 3:
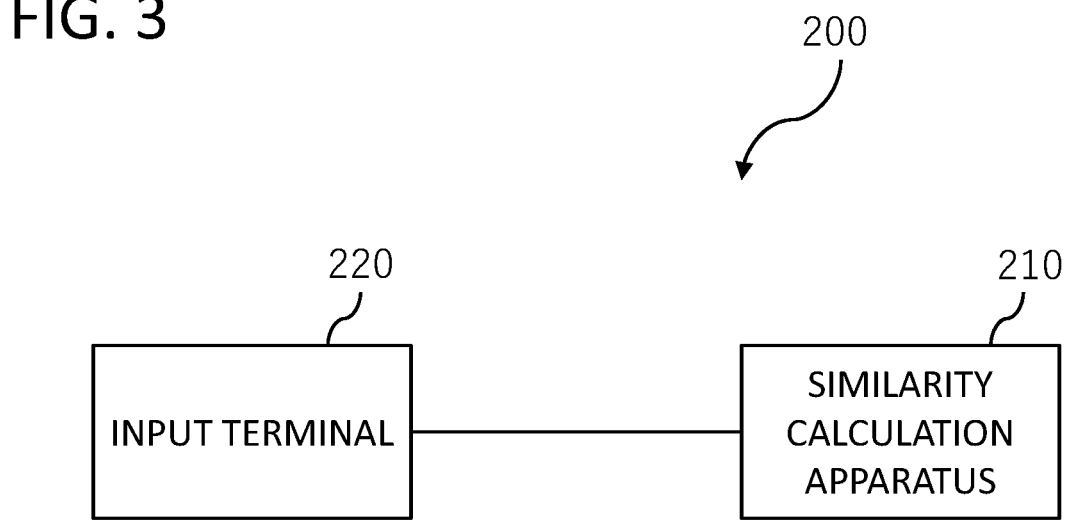
FIG. 3 is a block diagram showing a schematic configuration example of a similarity calculation system according to a second example embodiment.

The following describes a similarity calculation system relating to a second example embodiment with reference to FIG. 3. The second example embodiment is a practical example embodiment, and a film recommendation service is used as an example to describe the present example embodiment. FIG. 3 is a block diagram showing a schematic configuration example of the similarity calculation system according to the second example embodiment.

As shown in FIG. 3, the similarity calculation system 200 relating to the second example embodiment comprises a similarity calculation apparatus 210 and an input terminal 220. The similarity calculation apparatus 210 is an information processing apparatus (computer), the hardware configuration of which will be described using an example later. The input terminal 220 may be a stand-alone information processing apparatus (computer) or a device that is part of the similarity calculation apparatus 210. The similarity calculation apparatus 210 and the input terminal 220 may be connected by wired or wireless communication. For instance, the input terminal 220 may be a general-purpose personal computer or a mobile terminal such as a smartphone.

In the similarity calculation system 200 relating to the second example embodiment shown in FIG. 3 and used as a film recommendation service, the elements of the first vector ($x_1$, $x_2$, $x_n$) encrypted and stored in the similarity calculation apparatus 210 are favorability rating values for each of n films $M_1$, $M_2$, . . . , $M_n$. Here, in a six-level evaluation system (0 to 5), the value of each element is $x_i \in \{0, 1, 2, \ldots, 5\}$. Further, according to the number of raters, a plurality of the first vectors ($x_1$, $x_2$, . . . , $x_n$) are stored in the similarity calculation apparatus 210.

Meanwhile, the elements of the second vector ($y_1$, $y_2$, $y_n$) entered from the input terminal 220 are favorability rating values for each of the n films $M_1$, $M_2$, . . . , $M_n$, provided by a user of the film recommendation service. In other words, the distance between the first vector ($x_1$, $x_2$, . . . , $x_n$) and the second vector ($y_1$, $y_2$, . . . , $y_n$) indicates how close the taste of a rater who provided the first vector ($x_1$, $x_2$, . . . , $x_n$) in film is to that of the user who provided the second vector ($y_1$, $y_2$, . . . , $y_n$). Therefore, the film recommendation service is implemented by selecting from the plurality of the first vectors ($x_1$, $x_2$, . . . , $x_n$) stored in the similarity calculation apparatus 210 the one having the shortest distance to the second vector ($y_1$, $y_2$, . . . , $y_n$) and transmitting the values linked to the selected first vector ($x_1$, $x_2$, . . . , $x_n$) to the input terminal. Further, the values linked to the selected first vector ($x_1$, $x_2$, . . . , $x_n$) may be rating values for films other than the n films $M_1$, $M_2$, . . . , $M_n$ for which the rating values have been entered or the names of films other than the n films $M_1$, $M_2$, . . . , $M_n$ for which the rating values have been entered.

The following describes the film recommendation service using nonlinearly weighted distances. As stated above, the non-linear weighting used here does not mean giving different constant weights to the elements of the first vector ($x_1$, $x_2$, . . . , $x_n$) and the second vector ($y_1$, $y_2$, . . . , $y_n$), but it means that the weight value varies according to the values of elements $x_i$, $y_i$ (i=1, . . . , n). Therefore, the weight value varies according to the film rating values $x_1$, $y_1 \in \{0, 1, 2, \ldots, 5\}$ in the film recommendation service. Film rating combinations ($x_1$, $y_1$)=(0, 1) and ($x_1$, $y_1$)=(4, 5)

simply have the same difference "1" in rating value, but they are different in the sense that the ratings are close and favorable in one and close and unfavorable in the other. In the film recommendation service using nonlinearly weighted distances, it becomes possible to flexibly reflect such information in the film recommendation service.

The following describes the film recommendation service using nonlinearly weighted distances using a concrete example. The table below shows a second vector $(y_1, y_2, y_3, y_4)=(2, 3, 4, 5)$ entered into the input terminal 220 by a user $U_0$ of the film recommendation service, and a plurality of the first vectors stored in the similarity calculation apparatus 210: a first vector $(x_1, x_2, x_3, x_4)=(5, 3, 5, 4)$ provided by a rater $V_1$, a first vector $(x_1, x_2, x_3, x_4)=(5, 4, 3, 0)$ provided by a rater $V_2$, and a first vector $(x_1, x_2, x_3, x_4)=(3, 3, 1, 2)$ provided by a rater $V_3$.

TABLE 2

| | Film $M_1$ | Film $M_2$ | Film $M_3$ | Film $M_4$ | Euclidean distance (For reference) |
|---|---|---|---|---|---|
| User $U_0$ | 2 | 3 | 3 | 5 | |
| Rater $V_1$ | 5 | 3 | 5 | 4 | 14 |
| Rater $V_2$ | 5 | 4 | 3 | 0 | 35 |
| Rater $V_3$ | 3 | 3 | 1 | 2 | 14 |

In this example, distances are calculated using a weighted distance table (below) with respect to combinations of possible values $(x_1 \in \{0, 1, 2, \ldots, 5\})$ of the elements of the first vector and possible values $(y_i \in \{0, 1, 2, \ldots, 5\})$ of the elements of the second vector.

TABLE 3

| | | First vector element value | | | | | |
|---|---|---|---|---|---|---|---|
| | | 0 | 1 | 2 | 3 | 4 | 5 |
| Second | 0 | 0 | +1 | +2 | +50 | +100 | +500 |
| vector | 1 | +1 | 0 | +1 | +30 | +50 | +200 |
| element | 2 | +2 | +1 | 0 | +1 | +30 | +50 |
| value | 3 | +50 | +30 | +1 | 0 | +1 | +30 |
| | 4 | +100 | +50 | +30 | +1 | 0 | +1 |
| | 5 | +500 | +200 | +50 | +30 | +1 | 0 |

Then, the table below is obtained. Note that the entry notated as (5, 2) in the table below denotes Element (5, 2) in the weighted distance table.

TABLE 4

| | Film $M_1$ | Film $M_2$ | Film $M_3$ | Film $M_4$ | Euclidean distance |
|---|---|---|---|---|---|
| Element distance from Rater $V_1$ | (5, 2):50 | (3, 3):0 | (5, 3):30 | (4, 5):1 | 1151 |
| Element distance from Rater $V_2$ | (5, 2):50 | (4, 3):1 | (3, 3):0 | (0, 5):500 | 252501 |
| Element distance from Rater $V_3$ | (3, 2):1 | (3, 3):0 | (1, 3):30 | (2, 5):50 | 3401 |

In order to incorporate such nonlinearly weighted distances into a cryptographic protocol, the following computations are performed. Note that information encrypted here is the first vector $(x_1, x_2, \ldots, x_n)$. In the film recommendation service, the first vector $(x_1, x_2, \ldots, x_n)$ represents a rater's film preferences and should not be leaked to the outside.

[Registration Process]

The following first describes a process of registering the first vector $(x_1, x_2, \ldots, x_n)$ in the similarity calculation apparatus 210.

With the inputs being the number n of films and the number $V_{max}$ of raters to be compared, a public parameter p is created, and a public key pk and a secret key sk are generated using a homomorphic encryption key generation algorithm. The public parameter p and the public key pk for homomorphic encryption are used in the registration process.

Here, $(x_1, x_2, \ldots, x_n)$ are the rating values provided by a rater $V_j$ $(1 \leq j \leq V_{max})$ for the films $M_1, M_2, \ldots, M_n$. Each rater $V_j$ enters $x_j \in \{0, 1, 2, \ldots, 5\}$ $(1 \leq j \leq n)$ and then calculates a ciphertext $c_{i,j} = Enc(pk, 2^{xiN})$ of a rating value for each film $M_1$. The ciphertext $c_{i,j} = Enc(pk, 2^{xiN})$ is transmitted to the similarity calculation apparatus 210 and the ciphertext $c_{i,j}$ is stored for each rater.

Further, each rater $V_j$ may use the input terminal 220 as means for entering $x_i \in \{0, 1, 2, \ldots, 5\}$ $(1 \leq i \leq n)$. Each rater V may be a past user of the film recommendation service, and his or her rating values after the film recommendation service has ended may be registered in the similarity calculation apparatus 210.

[Rating Estimation Process]

When a user U of the film recommendation service wants to estimate how likely he or she will like a film M*, the user U transmits information of the film M* to the similarity calculation apparatus 210.

In response to this, the similarity calculation apparatus 210 transmits to the input terminal 220 the ciphertext of each element of the first vector of each rater $V_j$ and the weighted distance table with respect to combinations of possible values of the elements of the first vector and possible values of the elements of the second vector.

Meanwhile, the user U of the film recommendation service enters ratings for the films $M_1, M_2, \ldots, M_n$ required to estimate how likely he or she will like the film M*. More specifically, the user U enters the second vector $(y_1, y_2, \ldots, y_n)$. Note that, instead of having the user U enter the second vector $(y_1, y_2, \ldots, y_n)$ when he or she uses the film recommendation service, the second vector $(y_1, y_2, \ldots, y_n)$ may be entered into the input terminal 220 in advance.

The input terminal 220 calculates a ciphertext of the element distance using the ciphertext of each element of the first vector of each rater $V_j$ received from the similarity calculation apparatus 210, the weighted distance table with respect to combinations of possible values of the elements of the first vector and possible values of the elements of the second vector, and the second vector $(y_1, y_2, \ldots, y_n)$ entered by the user U.

The ciphertext of each element $x_i \in \{0, 1, 2, \ldots, 5\}$ $(1 \leq i \leq n)$ of the first vector $(x_1, x_2, \ldots, x_n)$ of each rater $V_j$ is encrypted by an encryption scheme that satisfies additive homomorphism and can be expressed by the following equation, for instance. Note that index i therein is an index assigned to each film $M_1$ $(1 \leq i \leq n)$, and index j is an index assigned to each rater $V_j$ $(1 \leq j \leq V_{max})$.

$$c_{i,j} = Enc(pk, 2^{xi_jN}) \qquad \text{[Math. 1]}$$

Further, the table below shows an example of the weighted distance table with respect to combinations of possible values of the elements of the first vector and possible values of the elements of the second vector, and each element can be mathematically expressed as $a^i[x_i][y_i]$.

TABLE 5

| | | First vector element value | | | | | |
|---|---|---|---|---|---|---|---|
| | | 0 | 1 | 2 | 3 | 4 | 5 |
| Second | 0 | 0 | +1 | +2 | +50 | +100 | +500 |
| vector | 1 | +1 | 0 | +1 | +30 | +50 | +200 |
| element | 2 | +2 | +1 | 0 | +1 | +30 | +50 |
| value | 3 | +50 | +30 | +1 | 0 | +1 | +30 |
| | 4 | +100 | +50 | +30 | +1 | 0 | +1 |
| | 5 | +500 | +200 | +50 | +30 | +1 | 0 |

Therefore, using the second vector $(y_1, y_2, \ldots, y_n)$ entered by the user U, a linear combination obtained by multiplying all combinations of the value $y_i$ of a single element of the second vector and possible values $x_i \in \{0, 1, 2, \ldots, 5\}$ $(1 \leq i \leq n)$ of the elements of the first vector corresponding to this single element by the weights can be stored by applying the linear combination to the ciphertext of each element of the first vector. More specifically, for instance, this ciphertext can be expressed as follows:

$$d_{i,j} = (c_{i,j})^{a^i[0][y_i] \cdot 2^{5N} + a^i[1][y_i] \cdot 2^{4N} + a^i[2][y_i] \cdot 2^{3N} + \ldots + a^i[5][y_i]} \qquad \text{[Math. 2]}$$

After the distance between the first and the second vectors is calculated, a random vector is created to mask the result other than the portion of the resultant score. By doing so, it is possible to prevent the information from leaking from parts other than the resultant score.

Then, the input terminal 220 calculates the sum of the ciphertexts $d_{i,j}$ of the element distances with respect to the elements $y_i \in \{0, 1, 2, \ldots, 5\}$ $(1 \leq i \leq n)$ of the second vector using additive homomorphic encryption. In other words, the input terminal 220 calculates the sum with respect to the index i using the rules of additive homomorphic encryption as in the following equation:

$$d_j = \text{HomAdd}(d_{1,j}, d_{2,j}, \ldots, d_{i,j}, \ldots, d_{n,j}) \qquad \text{[Math. 3]}$$

Then, the input terminal 220 transmits the ciphertext $d_j$ to the similarity calculation apparatus 210.

The similarity calculation apparatus 210 extracts the distance between the first and the second vectors from the ciphertext $d_j$ received from the input terminal 220. As stated above, unnecessary information is included since the ciphertexts were calculated from the element distances with respect to all combinations with possible values of the elements of the first vector. The similarity calculation apparatus 210 extracts necessary information from the ciphertext of the sum received from the input terminal 120. The following describes the principle of this extraction method.

As can be seen from the description above, the ciphertexts $c_{i,j}$ and $d_{i,j}$ store information in base-2 exponents. Therefore, according to the law of exponents, what we need to do is consider the calculation of exponents. Further, in terms of computer processing, the fact that information is stored in base-2 exponents corresponds to the problem of digits that store information when bit decomposition is performed. Then, the method for extracting necessary information from the ciphertext of the sum received comes down to a bit shift problem as follows:

$$a^i[0][y_i] \cdot 2^{(x_i+5)N} + a^i[1][y_i] \cdot 2^{(x_i+4)N} + a^i[2][y_i] \cdot 2^{(x_i+3)N} + \ldots + a^i[5][y_i] \cdot 2^{x_iN} \qquad \text{[Math. 4]}$$

More specifically, one can see that the similarity calculation apparatus 210 needs to extract the 5N- to 6N-bit portion from the ciphertext of the sum received. In other words, the similarity calculation apparatus 210 decrypts the ciphertext of the sum received, extracts the 5N- to 6N-bit portion of the plaintext, and deems this portion to be the distance between the first and the second vectors.

The similarity calculation apparatus 210 performs the process described above for all the raters $V_j$ $(1 \leq j \leq V_{max})$ and searches for the rater $V_j$ with the shortest distance between the first and the second vectors. Then, the similarity calculation apparatus 210 transmits to the input terminal 220 the rating value given to the film M* by the rater $V_j$ with the shortest distance between the first and the second vectors.

The user U of the film recommendation service is thus able to know how likely he or she will like the film M*.

As described above, since the similarity calculation system according to the second example embodiment can calculate nonlinearly weighted similarity without decrypting the ciphertext, it can be suitably applied to a film recommendation service. It goes without saying that the similarity calculation system according to the second example embodiment is not limited to a film recommendation service and can be applied to various recommendation services. Further, the applications of the similarity calculation system according to the second example embodiment are not limited to recommendation services and include various examples that involve calculating vector similarity.

[Hardware Configuration]

Figure 4:
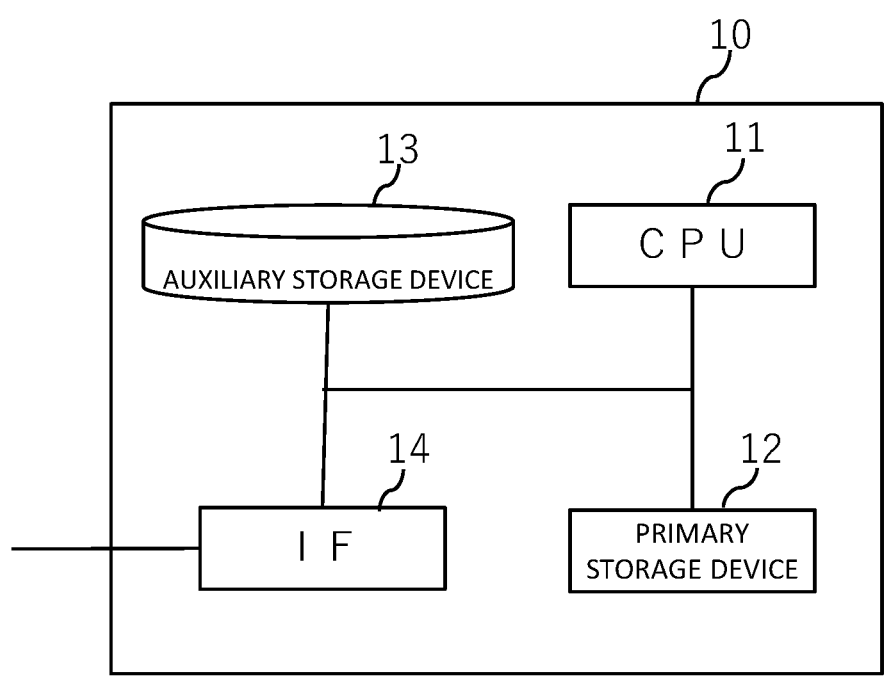
FIG. 4 is a drawing showing an example of the hardware configuration of a similarity calculation apparatus.

FIG. 4 is a drawing showing an example of the hardware configuration of the similarity calculation apparatus. In other words, the hardware configuration example shown in FIG. 4 is an example of the hardware configuration of the similarity calculation apparatuses 110 and 210. Further, since the input terminals 120 and 220 may be stand-alone information processing apparatuses (computers) as stated above, the hardware configuration example shown in FIG. 4 may also be used as that of the input terminals 120 and 220.

An information processing apparatus (computer) employing the hardware configuration shown in FIG. 4 can achieve the functions of the similarity calculation apparatuses 110 and 210 by executing the similarity calculation method described above as a program. It should be noted that the hardware configuration example shown in FIG. 4 is merely an example of the hardware configuration that achieves the functions of the similarity calculation apparatuses 110 and 210, and is not intended to limit the hardware configuration of the similarity calculation apparatuses 110 and 210. The similarity calculation apparatuses 110 and 210 may include hardware not shown in FIG. 4.

As shown in FIG. 4, the hardware configuration 10 that may be employed by the similarity calculation apparatuses 110 and 210 comprises a CPU (Central Processing Unit) 11, a primary storage device 12, an auxiliary storage device 13, and an IF (interface) part 14. These elements are connected to each other by, for instance, an internal bus.

The CPU 11 executes each instruction included in the similarity calculation program executed by the similarity calculation apparatuses 110 and 210. The primary storage device 12 is, for instance, a RAM (Random Access Memory) and temporarily stores various programs such as the similarity calculation program executed by the similarity calculation apparatuses 110 and 210 so that the CPU 11 can process the programs.

The auxiliary storage device 13 is, for instance, an HDD (Hard Disk Drive) and is capable of storing the various programs, such as the similarity calculation program executed by the similarity calculation apparatuses 110 and 210, in the medium to long term. The various programs such as the similarity calculation program may be provided as a program product stored in a non-transitory computer-readable storage medium. The auxiliary storage device 13 can be used to store the various programs such as the similarity calculation program stored in the non-transitory computer-readable storage medium in the medium to long term. The IF part 14 provides an interface to the input and output between the similarity calculation apparatuses 110 and 210 and the input terminals 120 and 220.

The information processing apparatus employing the hardware configuration 10 described above achieves the functions of the similarity calculation apparatuses 110 and 210 by executing the similarity calculation method described above as a program.

Some or all of the example embodiments above can be described as (but not limited to) the following Supplementary Notes.

[Supplementary Note 1]

A similarity calculation system calculating a distance between a first vector encrypted and stored in a similarity calculation apparatus and a second vector entered from an input terminal, wherein the similarity calculation apparatus transmits to the input terminal a ciphertext of each element of the first vector and a weighted distance table with respect to combinations of possible values of the elements of the first vector and possible values of the elements of the second vector, the input terminal refers to the weighted distance table to calculate a ciphertext of element distances for all combinations of the value of a single element of the second vector and possible values of elements of the first vector corresponding to the single element, calculates the ciphertexts of the sum of the element distances for each element of the second vector using additive homomorphic encryption, and transmits the ciphertext of the sum to the similarity calculation apparatus, and the similarity calculation apparatus extracts the distance between the first and the second vectors from the ciphertext of the sum.

[Supplementary Note 2]

The similarity calculation system according to Supplementary Note 1, wherein the ciphertext of each element of the first vector is encrypted by an encryption scheme that satisfies additive homomorphism, and the ciphertext of the element distance stores a linear combination obtained by multiplying all combinations of the value of a single element of the second vector and possible values of the elements of the first vector corresponding to the single element by the weights by applying the linear combination to the ciphertext of each element of the first vector.

[Supplementary Note 3]

The similarity calculation system according to Supplementary Note 2, wherein the ciphertext $c_j$ of each element of the first vector and the ciphertext $d_i$ of the first vector and the element distance can be defined as follows, respectively, when the first vector is $(x_1, x_2, \ldots, x_n)$ $[x_i \in \{0, 1, 2, \ldots, 5\}]$, the second vector is $(y_1, y_2, \ldots, y_n)$ $[y_i \in \{0, 1, 2, \ldots, 5\}]$, and each element in the weighted distance table is $a^i[x_i][y_i]$:

$$c_j = \mathrm{Enc}(pk, 2^{x_i \cdot N})$$

$$d_j = (c_j)^{a^i[0][y_i] \cdot 2^{5N} + a^i[1][y_i] \cdot 2^{4N} a^i[2][y_i] \cdot 2^{3N} + \ldots + a^i[5][y_i]} \qquad \text{[Math. 5]}$$

[Supplementary Note 4]

The similarity calculation system according to any one of Supplementary Notes 1 to 3, wherein a plurality of the first vectors are stored in the similarity calculation apparatus and the distances between the first and the second vectors are calculated for all the first vectors.

[Supplementary Note 5]

The similarity calculation system according to Supplementary Note 4, selecting from the plurality of the first vectors stored in the similarity calculation apparatus the one having the shortest distance to the second vector and transmitting the values linked to the selected first vector to the input terminal.

[Supplementary Note 6]

The similarity calculation system according to Supplementary Note 5, wherein the second vector entered from the input terminal is included as one of the plurality of the first vectors stored in the similarity calculation apparatus after the values linked to the selected first vector are transmitted to the input terminal.

[Supplementary Note 7]

The similarity calculation system according to Supplementary Note 6, wherein the input terminal transmits the second vector to the similarity calculation apparatus after encrypting the second vector using a public key published by the similarity calculation apparatus.

[Supplementary Note 8]

A similarity calculation apparatus calculating a distance between a first vector stored while being encrypted and a second vector entered from an input terminal, the similarity calculation apparatus:

transmitting to the input terminal a ciphertext of each element of the first vector and a weighted distance table with respect to combinations of possible values of the elements of the first vector and possible values of the elements of the second vector; having the input terminal refer to the weighted distance table to calculate a ciphertext of element distances for all combinations of the value of a single element of the second vector and possible values of elements of the first vector corresponding to the single element and receiving from the input terminal a ciphertext of the ciphertexts of the sum of the element distances calculated for each element of the second vector using additive homomorphic encryption; and extracting the distance between the first and the second vectors from the ciphertext of the sum.

[Supplementary Note 9]

A similarity calculation method calculating a distance between a first vector encrypted and stored in a similarity calculation apparatus and a second vector entered from an input terminal, wherein the similarity calculation apparatus transmits to the input terminal a ciphertext of each element of the first vector and a weighted distance table with respect to combinations of possible values of the elements of the first vector and possible values of the elements of the second vector, the input terminal refers to the weighted distance table to calculate a ciphertext of element distances for all combinations of the value of a single element of the second vector and possible values of elements of the first vector corresponding to the single element, calculates the ciphertexts of the sum of the element distances for each element of the second vector using additive homomorphic encryption, and transmits the ciphertext of the sum to the similarity calculation apparatus, and the similarity calculation apparatus extracts the distance between the first and the second vectors from the ciphertext of the sum.

[Supplementary Note 10]

A similarity calculation program causing a computer to calculate a distance between a first vector stored while being encrypted and a second vector entered from an input terminal, the similarity calculation program:

transmitting to the input terminal a ciphertext of each element of the first vector and a weighted distance table with respect to combinations of possible values of the elements of the first vector and possible values of the elements of the second vector; having the input terminal refer to the weighted distance table to calculate a ciphertext of element distances for all combinations of the value of a single element of the second vector and possible values of elements of the first vector corresponding to the single element and receiving from the input terminal the ciphertext of the sum of the element distances calculated for each element of the second vector using additive homomorphic encryption; and extracting the distance between the first and the second vectors from the ciphertext of the sum.

Further, the disclosure of Patent Literature cited above is incorporated herein in its entirety by reference thereto. It is to be noted that it is possible to modify or adjust the example embodiments or examples within the scope of the whole disclosure of the present invention (including the Claims) and based on the basic technical concept thereof. Further, it is possible to variously combine or select (or partially omit) a wide variety of the disclosed elements (including the individual elements of the individual claims, the individual elements of the individual example embodiments or examples, and the individual elements of the individual figures) within the scope of the whole disclosure of the present invention. That is, it is self-explanatory that the present invention includes any types of variations and modifications to be done by a skilled person according to the whole disclosure including the Claims and the technical concept of the present invention. Particularly, any numerical ranges disclosed herein should be interpreted that any intermediate values or subranges falling within the disclosed ranges are also concretely disclosed even without specific recital thereof. In addition, using some or all of the disclosed matters in the literature cited above as necessary, in combination with the matters described herein, as part of the disclosure of the present invention in accordance with the object of the present invention shall be considered to be included in the disclosed matters of the present application.

REFERENCE SIGNS LIST

100, 200: similarity calculation system
110, 210: similarity calculation apparatus
120, 220: input terminal
10: hardware configuration
11: CPU (Central Processing Unit)
12: primary storage device
13: auxiliary storage device
14: IF (interface) part

What is claimed is:

1. A similarity calculation system calculating a distance between a first vector encrypted and stored in a similarity calculation apparatus and a second vector entered from an input terminal, wherein the similarity calculation apparatus transmits to the input terminal a ciphertext of each element of the first vector and a weighted distance table with respect to combinations of possible values of the elements of the first vector and possible values of the elements of the second vector, the input terminal refers to the weighted distance table to calculate a ciphertext of element distances for all combinations of the value of a single element of the second vector and possible values of elements of the first vector corresponding to the single element, calculates a ciphertext of the sum of the element distances for each element of the second vector using additive homomorphic encryption, and transmits the ciphertext of the sum to the similarity calculation apparatus, and the similarity calculation apparatus extracts the distance between the first and the second vectors from the ciphertext of the sum, wherein a plurality of the first vectors are stored in the similarity calculation apparatus and the distances between the first and the second vectors are calculated for all the first vectors, and wherein the similarity calculation apparatus selects from the plurality of the first vectors stored in the similarity calculation apparatus the one having the shortest distance to the second vector and transmits the values linked to the selected first vector to the input terminal.

2. The similarity calculation system according to claim 1, wherein the ciphertext of each element of the first vector is encrypted by an encryption scheme that satisfies additive homomorphism, and the ciphertext of the element distance stores a linear combination obtained by multiplying all combinations of the value of a single element of the second vector and possible values of the elements of the first vector corresponding to the single element by the weights by applying the linear combination to the ciphertext of each element of the first vector.

3. The similarity calculation system according to claim 2, wherein the ciphertext cj of each element of the first vector and the ciphertext di of the first vector and the element distance can be defined as follows, respectively, when the first vector is (x1, x2, . . . , xn) [xi∈{0, 1, 2, . . . , S}], the second vector is (y1, y2, . . . , yn) [yi∈{0, 1, 2, . . . , S}], and each element in the weighted distance table is ai[xi][yi]:

$$c_i = \mathrm{Enc}(pk, 2^{x_i N})$$

$$d_i = (c_i)^{a^i[0][y_i] \cdot 2^{5N} + a^i[1][y_i] \cdot 2^{4N} + a^i[2][y_i] \cdot 2^{3N} + \ldots + a^i[S][y_i]} \qquad \text{[Math. 1]}.$$

4. The similarity calculation system according to claim 1, wherein the second vector entered from the input terminal is included as one of the plurality of the first vectors stored in the similarity calculation apparatus after the values linked to the selected first vector are transmitted to the input terminal.

5. The similarity calculation system according to claim 4, wherein the input terminal transmits the second vector to the similarity calculation apparatus after encrypting the second vector using a public key published by the similarity calculation apparatus.

6. A similarity calculation apparatus calculating a distance between a first vector stored while being encrypted and a second vector entered from an input terminal, the similarity calculation apparatus:

transmitting to the input terminal a ciphertext of each element of the first vector and a weighted distance table with respect to combinations of possible values of the elements of the first vector and possible values of the elements of the second vector;

having the input terminal refer to the weighted distance table to calculate a ciphertext of element distances for all combinations of the value of a single element of the second vector and possible values of elements of the first vector corresponding to the single element and receiving from the input terminal a ciphertext of the sum of the element distances calculated for each element of the second vector using additive homomorphic encryption; and extracting the distance between the first and the second vectors from the ciphertext of the sum, wherein a plurality of the first vectors are stored in the similarity calculation apparatus and the distances between the first and the second vectors are calculated for all the first vectors, and wherein the similarity calculation apparatus selects from the plurality of the first vectors stored in the similarity calculation apparatus the one having the shortest distance to the second vector and transmits the values linked to the selected first vector to the input terminal.

7. A similarity calculation method calculating a distance between a first vector encrypted and stored in a similarity calculation apparatus and a second vector entered from an input terminal, wherein the similarity calculation apparatus transmits to the input terminal a ciphertext of each element of the first vector and a weighted distance table with respect to combinations of possible values of the elements of the first vector and possible values of the elements of the second vector, the input terminal refers to the weighted distance table to calculate a ciphertext of element distances for all combinations of the value of a single element of the second vector and possible values of elements of the first vector corresponding to the single element, calculates a ciphertext of the sum of the element distances for each element of the second vector using additive homomorphic encryption, and transmits the ciphertext of the sum to the similarity calculation apparatus, and the similarity calculation apparatus extracts the distance between the first and the second vectors from the ciphertext of the sum, wherein a plurality of the first vectors are stored in the similarity calculation apparatus and the distances between the first and the second vectors are calculated for all the first vectors, and wherein the method further comprises the similarity calculation apparatus selecting from the plurality of the first vectors stored in the similarity calculation apparatus the one having the shortest distance to the second vector and transmitting the values linked to the selected first vector to the input terminal.

8. A non-transient computer readable medium storing similarity calculation program causing a computer to calculate a distance between a first vector stored while being encrypted and a second vector entered from an input terminal, the similarity calculation program:

transmitting to the input terminal a ciphertext of each element of the first vector and a weighted distance table with respect to combinations of possible values of the elements of the first vector and possible values of the elements of the second vector;

having the input terminal refer to the weighted distance table to calculate a ciphertext of element distances for all combinations of the value of a single element of the second vector and possible values of elements of the first vector corresponding to the single element and receiving from the input terminal a ciphertext of the sum of the element distances calculated for each element of the second vector using additive homomorphic encryption; and extracting the distance between the first and the second vectors from the ciphertext of the sum, wherein a plurality of the first vectors are stored in the similarity calculation apparatus and the distances between the first and the second vectors are calculated for all the first vectors, and wherein the similarity calculation program further causes the computer to select from the plurality of the first vectors stored in the similarity calculation apparatus the one having the shortest distance to the second vector and transmit the values linked to the selected first vector to the input terminal.

9. The similarity calculation apparatus according to claim 6, wherein the ciphertext of each element of the first vector is encrypted by an encryption scheme that satisfies additive homomorphism, and the ciphertext of the element distance stores a linear combination obtained by multiplying all combinations of the value of a single element of the second vector and possible values of the elements of the first vector corresponding to the single element by the weights by applying the linear combination to the ciphertext of each element of the first vector.

10. The similarity calculation apparatus according to claim 9, wherein the ciphertext cj of each element of the first vector and the ciphertext di of the first vector and the element distance can be defined as follows, respectively, when the first vector is (x1, x2, . . . , xn) [xi∈{0, 1, 2, . . . , S}], the second vector is (y1, y2, . . . , yn) [yi∈{0, 1, 2, . . . , S}], and each element in the weighted distance table is ai[xi][yi]:

$$c_i = \mathrm{Enc}(pk, 2^{x_i N})$$

$$d_i = (c_i)^{a^i[0][y_i] \cdot 2^{5N} + a^i[1][y_i] \cdot 2^{4N} + a^i[2][y_i] \cdot 2^{3N} + \ldots + a^i[S][y_i]} \qquad \text{[Math. 2]}.$$

11. The similarity calculation method according to claim 7, wherein the ciphertext of each element of the first vector is encrypted by an encryption scheme that satisfies additive homomorphism, and the ciphertext of the element distance stores a linear combination obtained by multiplying all combinations of the value of a single element of the second vector and possible values of the elements of the first vector corresponding to the single element by the weights by applying the linear combination to the ciphertext of each element of the first vector.

12. The similarity calculation method according to claim 11, wherein the ciphertext cj of each element of the first vector and the ciphertext di of the first vector and the element distance can be defined as follows, respectively, when the first vector is $(x1, x2, \ldots, xn)$ $[xi \in \{0, 1, 2, \ldots, S\}]$, the second vector is $(y1, y2, \ldots, yn)$ $[yi \in \{0, 1, 2, \ldots, S\}]$, and each element in the weighted distance table is $ai[xi][yi]$:

$$c_i = \text{Enc}(pk, 2^{x_i N})$$

$$d_i = (c_i)^{a^i[0][y_i] \cdot 2^{5N} + a^i[1][y_i] \cdot 2^{4N} + a^i[2][y_i] \cdot 2^{3N} + \ldots + a^i[S][y_i]} \qquad \text{[Math. 3]}.$$

\* \* \* \* \*